United States Patent
Baker (10) Patent No.: US 8,786,595 B2
(45) Date of Patent: Jul. 22, 2014

(54) SYSTEMS AND METHODS FOR ESTIMATING A PARAMETER FOR A 3D MODEL

(75) Inventor: Brandon Baker, Salt Lake City, UT (US)

(73) Assignee: Pinpoint 3D, Holladay, UT (US)

( * ) Notice: Subject to any disclaimer, the term of this patent is extended or adjusted under 35 U.S.C. 154(b) by 760 days.

(21) Appl. No.: 12/482,327

(22) Filed: Jun. 10, 2009

(65) Prior Publication Data
US 2010/0315419 A1 Dec. 16, 2010

Related U.S. Application Data

(60) Provisional application No. 61/131,495, filed on Jun. 10, 2008, provisional application No. 61/138,191, filed on Dec. 17, 2008, provisional application No. 61/152,212, filed on Feb. 12, 2009, provisional application No. 61/157,424, filed on Mar. 4, 2009.

(51) Int. Cl.
*G06T 15/00* (2011.01)

(52) U.S. Cl.
USPC .................. 345/419; 345/581; 382/154

(58) Field of Classification Search
USPC ............... 345/419, 426, 427, 441; 382/154
See application file for complete search history.

(56) References Cited

U.S. PATENT DOCUMENTS

| | | | |
|---|---|---|---|
| 6,177,907 B1 * | 1/2001 | Golovin et al. | 342/458 |
| 6,353,679 B1 * | 3/2002 | Cham et al. | 382/228 |
| 6,628,821 B1 * | 9/2003 | Covell et al. | 382/155 |
| 6,750,873 B1 * | 6/2004 | Bernardini et al. | 345/582 |
| 7,289,662 B2 * | 10/2007 | Keaton et al. | 382/154 |
| 7,366,278 B2 * | 4/2008 | Fu et al. | 378/4 |
| 7,583,275 B2 * | 9/2009 | Neumann et al. | 345/633 |
| 8,204,302 B2 * | 6/2012 | Larsen et al. | 382/154 |
| 8,284,240 B2 * | 10/2012 | Saint-Pierre et al. | 348/47 |
| 2005/0168460 A1 * | 8/2005 | Razdan et al. | 345/419 |
| 2009/0284529 A1 * | 11/2009 | De Aguiar et al. | 345/420 |

OTHER PUBLICATIONS

Colombo et al. "Metric 3D Reconstruction and Texture Acquisition of Surfaces of Revolution from a Single Uncalibrated View"; IEEE 2005.*

Tang et al. "Self-Calibraion for Metric 3D Reconstruction Using Homography". MVA 2007 IAPR COnference on Machine Vision Application.*

* cited by examiner

*Primary Examiner* — Kimbinh T Nguyen
(74) *Attorney, Agent, or Firm* — Morriss O'Bryant Compagni, PC (57) ABSTRACT

The present invention estimates parameters for 3D models. Parameters may include, without limitation, surface topology, edge geometry, luminous or reflective characteristics, visual properties, characterization of noise in the signal, or other. A metric is estimated by quantifying a relationship between a received signal and a reference signal. The metric is then utilized to determine a parameter for a 3D model. The metric may include a measurement such as the cross-correlation of the received signal and the reference signal, or standard deviation of the difference of the received signal and the reference signal, for example. The parameter obtained may then be used to create a reference signal for determination of another parameter.

31 Claims, 6 Drawing Sheets

SYSTEMS AND METHODS FOR ESTIMATING A PARAMETER FOR A 3D MODEL

CROSS-REFERENCE TO RELATED APPLICATIONS

This application claims priority to U.S. Provisional Patent Application 61/131,495 filed by Brandon Baker on Jun. 10, 2008, entitled SYSTEMS AND METHODS FOR EFFICIENT UTILIZATION OF 3D SPATIAL DATA AND IMAGE DATA, U.S. Provisional Patent Application Ser. No. 61/138,191 filed by Brandon Baker on Dec. 17, 2008, entitled SYSTEMS AND METHODS FOR PARALLEL IMPLEMENTATION TO GENERATE A SURFACE FROM 3D POINTS U.S. Provisional Patent Application Ser. No. 61/152,212 filed by Brandon Baker on Feb. 12, 2009, entitled SYSTEMS AND METHODS FOR ADAPTIVE NOISE REMOVAL AND DATA REFINEMENT, and U.S. Provisional Patent Application Ser. No. 61/157,424 filed by Brandon Baker on Mar. 4, 2009, entitled SYSTEM AND METHODS FOR ESTIMATING PARAMETERS FOR A 3D MODEL.

FIELD OF THE INVENTION

The present invention pertains to systems and methods for estimating a parameter for a three dimensional model. More specifically, the present invention pertains to systems and methods for estimating surface parameters such as surface topology, edge geometry, the amount of noise present, or other 3D parameters.

DESCRIPTION OF RELATED ART

The current state of the art in parameter estimation lacks the robustness to adequately estimate parameters for 3D models in the presence of noise. Thus, noise removal is limited by the inability to detect whether or not the noise removal process compromised the integrity of the original data. The current state of the art lacks a general solution that performs well at the edges of 3D models. The current state of the art in noise removal is limited by the inability to detect whether or not the noise removal process compromised the integrity of the original data. Furthermore, the current state of the art lacks a solution that refines data while enhancing visual quality, maintaining or improving physical accuracy, or reducing data size effectively. Finally, the current state of the art lacks a robust method for applying reflective image information to such a 3D model that has been adequately processed.

SUMMARY OF THE INVENTION

The present invention estimates parameters for 3D models. Parameters may include, without limitation, surface topology, edge geometry, reflective characteristics, visual properties, characterization of noise in the signal, or other. A metric is estimated by quantifying a relationship between a received signal and a reference signal. That metric is then utilized to determine a parameter for a 3D model. Recent advancements in 3-dimensional (3D) data acquisition have created the need for tools that create 3D models from the acquired points. Points representing the 3D position, orientation, or other aspect of objects can be acquired accurately and rapidly; however, tools are needed to automatically process those points into useful formats, such as simplified 3D surfaces. The current state of the art requires extensive manual intervention to get accurate results, or the resultant 3D surface contains too much data to be considered useful. Furthermore, current implementations do not harness the immense capabilities of parallel processing. Hence, there is a need to overcome these challenges by automatically generating a surface from a plurality of 3D points using parallel processing. The present invention removes noise, for example, by estimating the level of noise present and then filtering out the noise. The accuracy of the filtered data is verified to ensure that the integrity of the original data is not compromised. The present invention also refines data such as a three dimensional mesh by identifying regions to be refined and then refining those regions.

DETAILED DESCRIPTION OF EXEMPLARY EMBODIMENTS

The present invention determines a parameter for a 3D model. The determined parameter may include without limitation, curvature, 3D surface, a slope, an angle, a position, a delay, topology, geometry, amount of noise present in the signal, boundary, non-coplanar surface intersection, normal vector, tangent plane, gradient, simple shape, or contour line.

One such embodiment of the present invention may comprise receiving a signal, estimating a metric that quantifies a relationship between the received signal and a reference signal, and determining a parameter from the estimated metric. The metric that quantifies a relationship between the received signal and a reference signal may comprise a correlation wherein the correlation is the expectation of the product of the received signal and a reference signal. Said metric may comprise an autocorrelation wherein the correlation is the expectation of the product of the received signal and an offset version of itself. Thus, the reference signal may be an offset version of the received signal, or may be a wavelet, sinusoid, Bezier curve, or other basis for reference. Likewise, the metric may be a quantification of error between the received signal and the reference signal including without limitation the maximum deviation, the median deviation, the mean deviation, the standard deviation, or other.

The received signal may include without limitation, a time based signal, or a spatially oriented signal, in one or more dimensions. The reference signal may be offset, scaled in one or more dimensions, partitioned, or altered in another way to attain a suitable metric for determining the parameter. The received signal comprises data that in some sense provide at least one characteristic of a 3D model, spatial, luminous, reflective, or other.

Determining the parameter may include without limitation, estimating the metric described herein that exhibits suitable properties such as the lowest mean, median, or standard deviation. The reference signal and the received signal may then be utilized to determine the parameter, based on the suitable property of the metric that has been estimated. Utilization of the reference and received signals may comprise extracting parameters directly from the received signal, directly from the reference signal, or a combination of the reference and received signals. Determining a parameter from the reference and received signals may comprise averaging both signals, linear time invariant filtering of both signals, or other operation.

Determining the parameter may comprise a numerical inversion technique such as: Newton method, Conjugate Gradient method, Line Search method, Steepest Descent method, Tikonov Regularization method, or other.

Furthermore, the reference signal may be determined by utilizing a parameter obtained by the present invention. Utilizing a parameter or set of parameters to determine the reference signal may comprise extracting suitable sections from a reference signal with more data. Extracting a section of the reference signal may utilize an edge detection method such as a Canny filter, Sobel filter, Hough transform, or other technique known to those skilled in the art.

If knowing a parameter such as surface topology is desired, the present invention may be utilized to extract an initial estimation of the topology of the surface. The present invention may further be utilized to determine the reflectance properties of the surface, from which characteristics pertaining to the amount of noise at any given location on the surface may be determined. Said characterization of noise may then be utilized with the present invention to isolate regions with common traits pertaining to the level of noise present, so that the further refinement of the surface may be effected. When the amount of noise present is known, determining the amount to which a metric may be considered suitable is more easily attained. When utilizing the standard deviation of the received signal and the reference signal to estimate a suitable metric for determining a parameter such as curvature of the edge of a 3D model, for example, the suitability depends largely on the amount of noise present. When a large amount of noise is detected in a certain region of a surface, for example, the tolerance for suitability increases.

It is understood that various 3D spatial data acquisition devices have non-linear noise characteristics. For example, 3D spatial data with normalized intensity values between 0% and 20% are ignored by some devices because the noise margin is too high. Likewise intensity values between 80% and 100% can be untrustworthy, if included in the data. Intensity values lower than 30% or higher than 70% exhibit excessive noise with respect to values outside of that range. Thus, segmentation may be utilized to isolate regions of common noise characteristics to better filter out the noise.

Furthermore, if determining a set of unknown parameters simultaneously is desired, and the problem represented does not have a unique solution, a range of acceptable values may be determined instead. For example, if diffuse reflectance and surface roughness were both unknown, but desired parameters, the surface roughness may be estimated among a set of suitable values, and the diffuse reflectance may then be determined as a corresponding set of values.

Diffuse reflectance may also be utilized to determine a parameter such as connectivity, for example. A set of 3D points may be connected in such a manner that in some sense best estimates the continuity of a particular type of surface. When the diffuse reflectance, for example, changes abruptly, a new surface may be created that adjoins, but is not merged with the neighboring surface.

Figure 1:
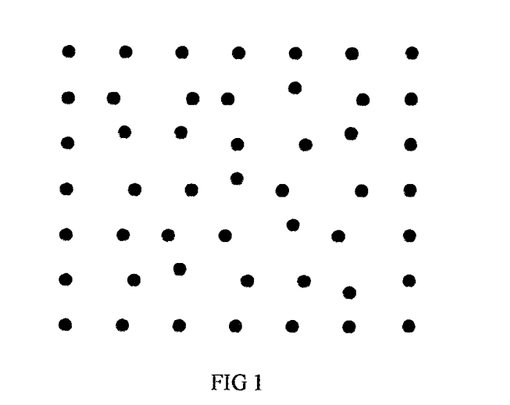
FIG. 1 is a set of 3D points representing a received signal that contains samples of the topology of a 3D surface.
Figure 2:
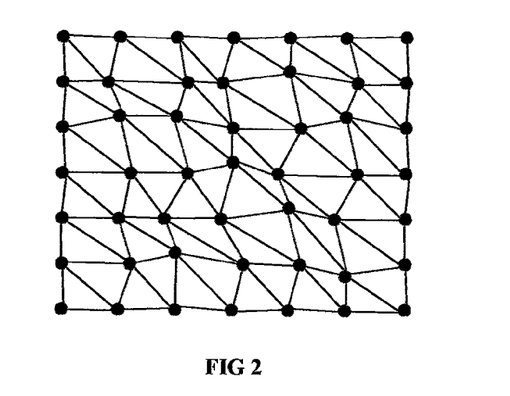
FIG. 2 is a triangulated network of the 3D points.
Figure 3:
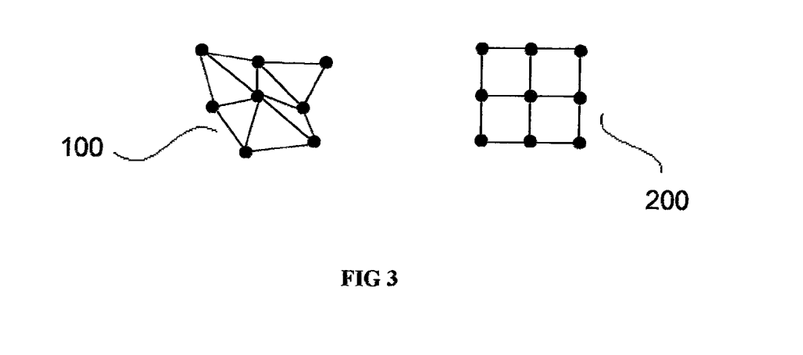
FIG. 3 illustrates an extracted section of the polygons in the triangulated network and a reference signal.

FIG. 1 is a set of 3D points representing a received signal that contains samples of the topology of a 3D surface. FIG. 2 is a triangulated network of the 3D points formed by Delaunay or other triangulation technique. FIG. 3 illustrates an extracted section of the polygons in the triangulated network (100) that correspond to a specular highlight of the surface, that is then utilized with a reference signal (300) that is a set of points in a plane. The suitability of the metric associated with the relationship between the received and reference signals for these data may be held to a lower standard than that of the rest of the data, due to the excessive specular highlight.

Figure 4:
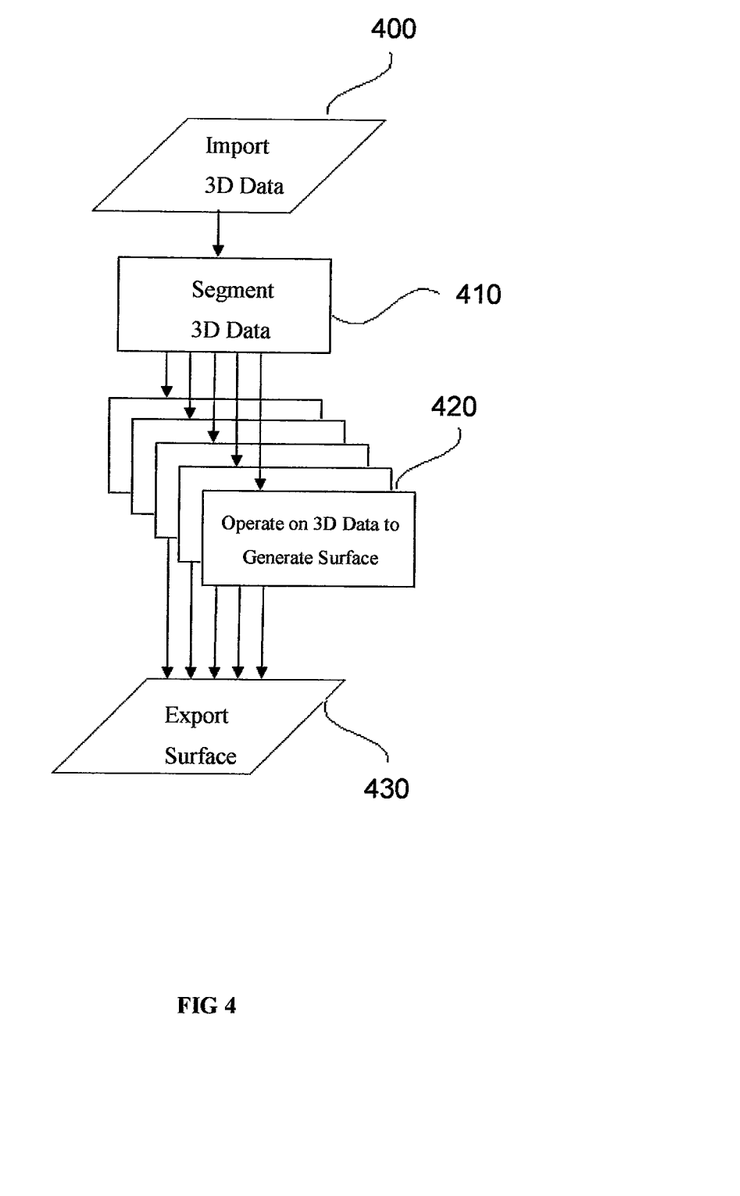
FIG. 4 illustrates a block diagram depicting the architecture and data path of the present invention.

FIG. 4 is a block diagram illustrating a parallel implementation to generate a surface from 3D points that includes importing 3D data 400, segmenting 3D data 410, performing in parallel a plurality of operations on 3D data using a plurality of channels of a graphics processing unit (GPU), network cluster, supercomputer, or central processing unit (CPU), the plurality of operations including one or more of surface generation operations 420, and exporting results of the plurality of operations for use in at least one subsequent operation 430.

3D data that may be utilized by the present invention includes, without limitation, terrestrial LiDAR, mobile LiDAR, aerial LiDAR, or from another 3D data acquisition device.

An exemplary embodiment of segmenting 3D data may include processing the data to determine proper boundaries for segmentation. Segmenting 3D data may include selecting a plurality of points that are related to each other in some fashion. Points may be determined to be related by methods including, without limitation, proximity to each other in 3D space, proximity to each other with respect to the angle or angles of projection from the acquisition device, acquisition time, cluster recognition (known to those skilled in the art) in one or more dimension of 3D space. The resultant size or sizes of segments may be determined by querying the capabilities (memory, processing power, or other) of the device utilized for segmenting, processing, or otherwise utilizing 3D data.

In another exemplary embodiment, the surface generation operations or segmentation method may include the removal of noise.

Performing in parallel a plurality of operations may includes calculating features of a surface or plurality of surfaces created from the 3D data into each of the plurality of channels with one of a plurality of kernels of 3D data input into each of the plurality of channels. Such features of a surface may include a method to calculate and assess a histogram of said features. Such features may include, without limitation, normal vectors of a surface created from the 3D data, localized clusters of points, or distances between points.

Figure 5:
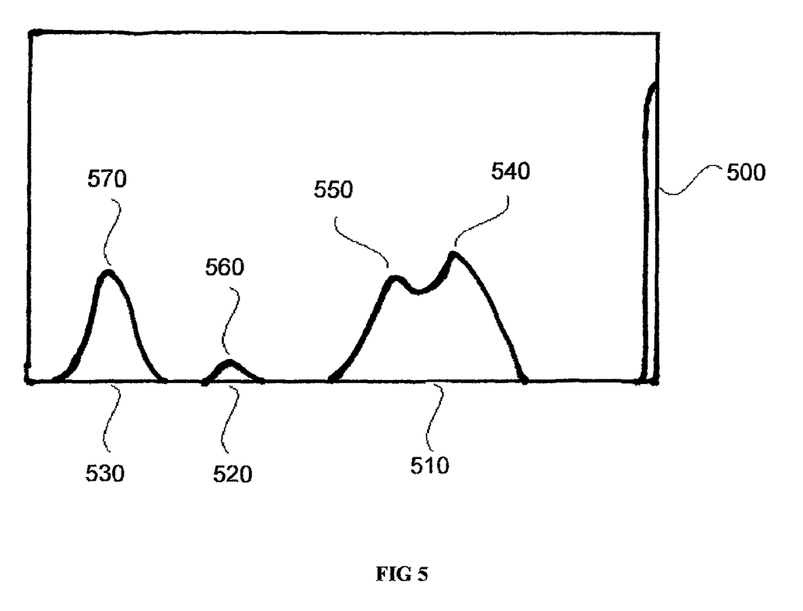
FIG. 5 illustrates a histogram of features of a generated surface.
Figure 6:
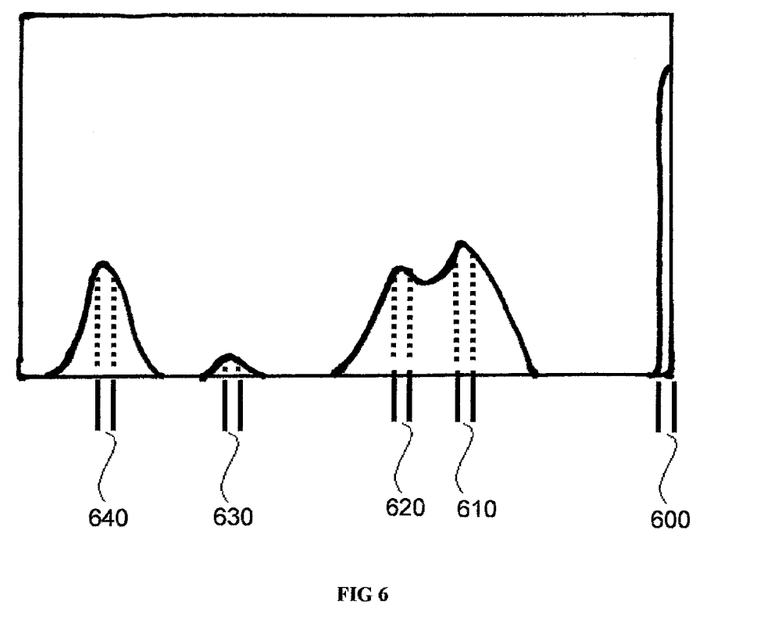
FIG. 6 illustrates the local maxima of the peaks in the histogram.

An exemplary embodiment of assessing the histogram 501 of features may comprise calculating the local and global maxima 500, 540, 550, 560, 570 of the histogram of normal vectors of a surface. The local maxima that were calculated correspond to maxima within clustered regions that appeared in the histogram 500, 510, 520, 530. In this exemplary embodiment regions of a surface may then be detected in the histogram that have common orientations in 3-dimensional space, such as a set of points that represent horizontal or vertical surfaces. Then, the present invention may partition the histogram into regions of similar orientation based on the global or local maxima of the histogram 600, 610, 620, 630, 640 by extracting regions of the surface that have surface normal vectors in the immediate vicinity of the local maxima.

Figure 7:
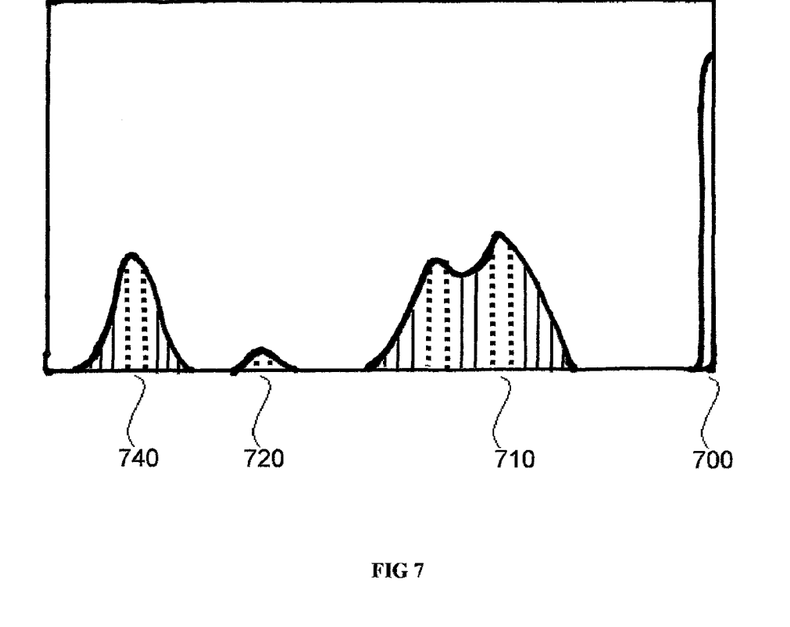
FIG. 7 illustrates segmented regions surrounding the local maxima of the peaks in the histogram.

By selecting break lines in the histogram that surround a local or global maxima of the histogram, the present invention can better detect where a break line should occur. Other break lines may then be calculated at intervals surrounding the global or local maxima already determined 700, 710, 720, 740.

Another exemplary embodiment of calculating features of a surface may include the calculation of a dot product of a defined vector and the normal vectors of the surface. Any regions where the calculation of the dot product is sufficiently large, within a tolerance, may be combined to be coplanar. The outlying boundary of where the threshold is not met may be utilized as a break line or boundary for simplified mesh generation. Another defined vector can then be passed and the process may be repeated to determine a simplified form of the resultant surface or set of surfaces.

The present invention may also be utilized to compare surface normal vectors of adjacent polygons without extracting a histogram of features. Such a technique will be far better than the current state of the art due to the nature of the parallel processing architecture that is described herein.

Yet another exemplary embodiment of the present invention may further comprise the utilization of joint information from the histogram of the normal vectors to then determine proper vectors for calculating the dot product. If no normal vectors exist in certain bands of the histogram, those vectors are not used in determining the dot product with the normal vectors of the surface.

The present invention may include utilizing user defined parameters. A user may require that as few as possible polygons representing the surface are exported. In this case, the user may define a tolerance for accuracy. A plurality of polygons representing a generated surface or portion of the surface can then be combined to form a single polygon representing the generated surface or portion of the surface without losing accuracy beyond the tolerance specified. This can be accomplished by calculating the distance from the point (vertex) or points (vertices) to be removed and the plane of the proposed polygon.

Thus, a simplified surface from regions within the 3D data where the surface represented by a plurality of 3D objects (such as triangles) can be represented as a single 3D object can be generated. Such exemplary embodiments exhibit extraordinary processing performance due to the nature of the parallel implementation described herein.

Furthermore, an exemplary embodiment of the present invention may include mapping visual information to the 3D objects that represent the surface that has been generated as a texture map. The texture map may consist of color or intensity information retrieved at the time the 3D data were acquired. Such visual information may be mapped to polygons representing the surface by linear projection of original 3D points that have since been removed. 3D data may represent color information acquired independent of the 3D data acquisition device, from a device such as a digital camera.

An exemplary embodiment may include mapping depth information that describes perturbations in the surface or the surface normal vectors to an array of values to be stored, rendered, or otherwise utilized in determining more detail related to the generated surface. Modern day graphics shading processors are able to parse arrays of values that typically represent visual information in other ways, such as depth maps or normal vector maps. Once break lines outlining a desired region in a surface are determined, the deviation of the surface from any point within the surface can be determined in a grid or array and then stored as a depth map. Likewise normal information may be stored in a similar manner, and more efficiently rendered on graphics hardware.

The present invention removes noise by estimating the level of noise present and then filtering out the noise. The accuracy of the filtered data is verified to ensure that the integrity of the original data is not compromised. The present invention also refines data such as a three dimensional mesh by identifying regions to be refined and then refining those regions.

Figure 8:
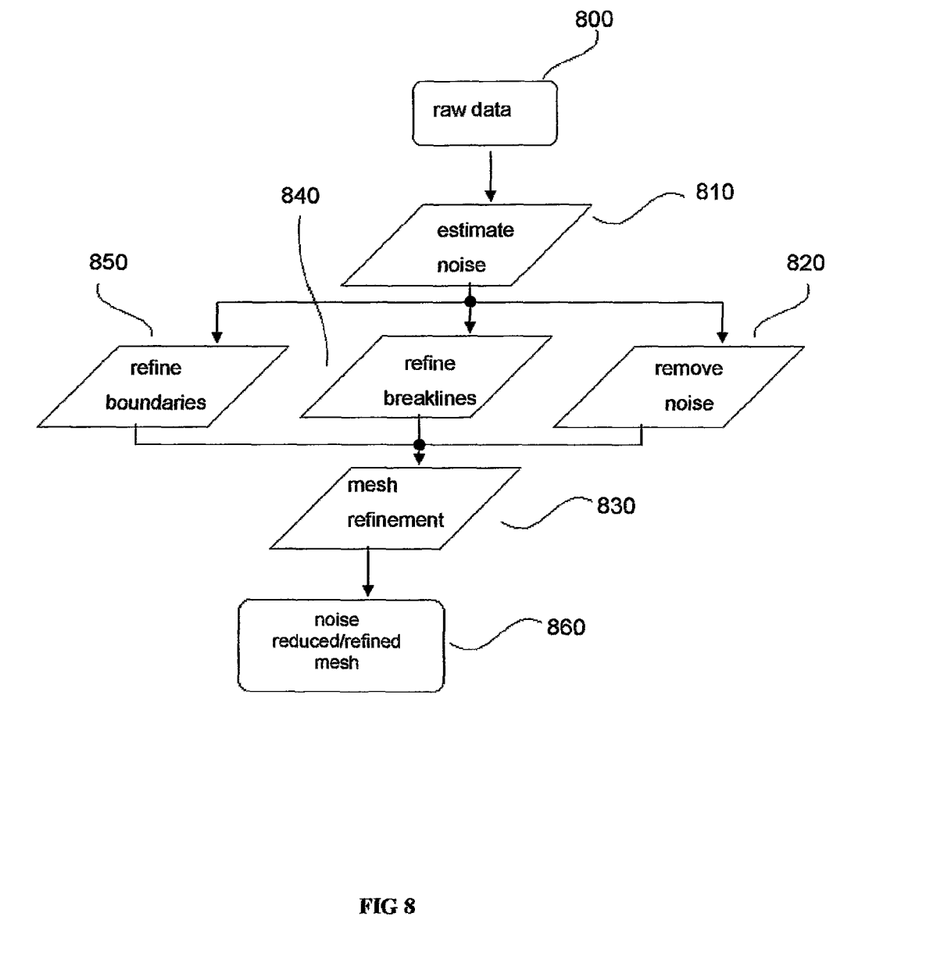
FIG. 8 shows an embodiment of the present invention to estimate noise in raw data, refine boundaries, breaklines, remove noise, then refine a three dimensional mesh.

FIG. 8 is a block diagram showing an embodiment of the present invention to estimate noise 800 in raw data 810, refine boundaries 850, breaklines 840, remove noise 820, then refine a three dimensional mesh 830. The systems and methods shown herein produce a noise reduced, refined mesh 860.

The removal of noise utilizing the systems and methods comprising the present invention may be accomplished in many different ways. The first step is the identification of the level of noise present in the data. One embodiment of the present invention for noise estimation may include the utilization of a clustering technique, such as k-means clustering, known to those skilled in the art. Via k-means clustering, one may detect common characteristics in the data, such as position in space, orientation relative to the acquisition device, or other. Once common properties have been identified and data sharing common properties have been isolated, the degree of randomness in the data can be detected. If the data have a common orientation, like points in three dimensional space that form the planar surface of a wall or a floor, for example, the orientation may be estimated, then the degree of variance from that estimated planar surface represents the estimated level of noise in the data. Other common properties may include, without limitation, distance from acquisition device, orientation of acquisition angle (vertical or horizontal), or other.

Another embodiment of the present invention may comprise the application of a filter to the raw data, and then estimate the deviation of the filtered data from the original. In doing so, the filtered data may be analyzed to ensure that the deviations present reflect characteristics of the anticipated noise in the system. If a data acquisition device with noise that had an expected zero-mean statistical characteristic were used to acquire the data, the deviation of the true data from the acquired data would have a zero mean, locally as well as globally, where the local region could be chosen by an arbitrarily large sample space. If filtered data do not exhibit expected characteristics relative to the raw data, sufficient adjustments may be made to correct the data to reflect results of a higher likelihood of accuracy.

The present invention may also be embodied in systems and methods that utilize a priori information regarding elements that affect the statistical characteristics of noise. Such characteristics could include, without limitation, the angle of surface relative to the scanner, the typical standard deviation of the particular data acquisition device used in acquiring the data, surface reflectivity, acquired data amplitude such as LIDAR data intensity, etc. When additional a priori information is present, a locally isolated region of relatively constant standard deviation (variance, or other characteristic) may be identified and processed independently until all regions of relatively constant variances have been processed. Such a system or method may be referred to operating on a locally consistent region.

Once the amount of noise present has been estimated, the noise may be removed. One such system and method for noise removal may comprise the usage of a directional filter. A directional filter may comprise positive and negative components of orthogonal vectors. Directional vectors may include, without limitation, range, polar or azimuth angles in spherical coordinates; x, y, or z vectors in Cartesian coordinates; u, or v coordinates (horizontal or vertical components of an image, for example); or other. A directional filter may be implemented by assigning each data point such as a three dimensional spatial data point, for example, a filtering direction. The filtering direction may comprise more than one direction component, since not all data are oriented perfectly in a single direction. The assigning of a filtering direction may include the correlation between neighboring data points' orientations and a particular filtering direction, for example. Elements that could be used to specify filtering direction may include, without limitation, surface normal, range, intensity, color information from a digital image acquisition device, or other.

Furthermore, the filtering direction vector at a given data point may be updated (adapted) as the filtering process progresses to more accurately represent the properties of the surface and the desired filtering direction. Likewise, as the filtering process progresses, filtered data may be analyzed to ensure that the deviation between the raw data and the filtered data exhibit proper statistical characteristics, such as locally identified regions of zero or near zero mean, or a sufficient number of data points lie within a specified tolerance, based on the estimated level of noise in the original data.

If the filtered data represent the mesh of a three dimensional surface, the mesh may be further refined by the present invention. The refinement of the mesh may comprise breakline extraction, boundary extraction, or mesh simplification. A breakline is a line that separates two potentially non-coplanar surfaces. The estimation of a breakline may be accomplished by several different methods, such as those disclosed in patent application 61/131,495, systems and methods for efficient utilization of 3D spatial data and image data, included herein by reference. Another embodiment that may be employed for the estimation and refinement of breaklines may be found in patent application 61/138,191, systems and methods for parallel implementation to generate a surface from 3D points, included herein by reference.

Additionally, the estimation of breaklines may be accomplished by applying a filter to the data and then statistically analyzing the degree of deviation from the original data. Breaklines can at times appear as connected regions of excess deviation from original data.

Boundaries are lines that represent the outermost edges of disconnected regions of data. Boundaries may be automatically detected by analyzing changes in properties of the data. If the distance from the data acquisition device, for instance, were to change abruptly, this may indicate a boundary separating from one region to another. Such a measure of change may be accomplished by a high pass filter, a simple derivative, a vectorized multivariable derivative, second derivative, or other. Such system or method of measurement may utilize a filtering direction vector, as described herein, to quantify the change in a particular property.

Lines (whether breaklines or boundaries) may be refined based on the results of an edge detection scheme such as a Prewitt, Sobel, Canny, Gaussian or other edge detection algorithm. Once a brealdine or boundary has been extracted, a filter utilized along the extracted line may be employed to clean up an otherwise jagged edge.

The noise reduced data may further include the reduction of unnecessary components. A mesh, for example, may have an excessive number of polygons. The breaklines and boundaries identified within this present invention may be utilized to further refine the data. Weights of relative importance may be assigned to various points within the mesh, such as along a breakline or a boundary. Polygon reduction schemes may utilize weighting properties to prioritize the elements of the mesh in a particular fashion. Vertices along a breakline or boundary may be more important to retain than those within a relatively coplanar region.

Mesh simplification may further be performed iteratively to ensure the accuracy is maintained. Where reduces mesh components compromise the integrity of the data, corrections may be made to ensure accuracy. This may include the insertion of polygons into the refined mesh, simply adjusting the vertices of the reduced mesh, or other method to restore the required accuracy.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention. Furthermore, the systems and methods represented herein may comprise a program storage device, a computer, hardware, software, FPGA, ASIC, ROM, or other device or element.

What is claimed is:

1. A method for refining a 3D computer model of the surface of a physical three dimensional object, the method comprising:
   receiving surface data representing a contoured surface of a three dimensional object into memory of a computer having a processor, said surface data generated by a data acquisition device capable of generating the surface data;
   estimating a noise level associated with the data with the processor;
   identifying a plurality of lines within the surface data with the processor, the plurality of lines each defining one of a breakline or a boundary of the contoured surface;
   segmenting the surface data along the line data with the processor into a plurality of line data kernels representing the plurality of lines and a plurality of surface data kernels representing a plurality of non-coplanar surfaces separated by the plurality of lines;
   computing a first set of parameters with the processor for a directional filter based on the estimated noise level;
   computing a second set of parameters with the processor for a surface filter based on the estimated noise level;
   applying the directional filter to each of the plurality of line data kernels in a direction of the line data for each of the line data kernels using a first channel of the processor operating in parallel to simultaneously remove noise from each the plurality of line data kernels;
   applying the surface filter to each of the plurality of surface data kernels using a second channel of the processor operating in parallel to the channel of the processor to simultaneously remove noise from each of the plurality of surface data kernels; and
   generating refined surface data representing the contoured surface of the three dimensional object from the filtered line data kernels and the filtered surface data kernels by combining the separately filtered line data kernels and the separately filtered surface data kernels with the processor.

2. The method of claim 1, wherein said estimating said noise level comprises estimating at least one of a correlation, a standard deviation of error, and a spatial relationship; and said receiving said surface data comprises receiving at least one of 3D spatial data, and reflectance data.

3. The method of claim 2, wherein identifying the plurality of lines comprises at least one of:

determining non-coplanar surface intersections represented by the surface data with the processor; and determining non-connected surface boundaries represented by the surface data with the processor.

4. The method of claim 3, wherein estimating a noise level comprises:

estimating surface and line noise removal parameters with the processor;

verifying accuracy of noise removal from the plurality of surface data kernels and the plurality of line data kernels with the processor; and updating surface and line noise removal parameters with the processor based on the verified accuracy.

5. The method of claim 3, wherein defining non-connected surface boundaries comprises:

identifying non-connected surfaces from the surface data;

parametrically defining adjacent non-connected surfaces from the surface data; and processing parametrically defined adjacent non-connected surfaces with the processor.

6. The method of claim 5, wherein identifying non-connected surfaces comprises determining an appropriate threshold to distinguish connected surfaces from nonconnected surfaces with the processor.

7. The method of claim 3 further comprising utilizing reflective data associated with the object to enhance a 3D computer model with at least one of:

aligning the reflective data to 3D spatial data with the processor;

creating geometric edges of polygons to correspond with edges of high deviation in the reflective data with the processor;

generating a bump map with the processor;

generating a depth map with the processor; and mapping error information to 3D spatial data with the processor.

8. The method of claim 4 wherein updating said surface and line noise removal parameters comprises updating at least one of: iso lines; gradient vector; curvature; slope; and level of noise.

9. The method of claim 1, further comprising:

performing in parallel a plurality of operations on the surface and line data using a plurality of channels of the processor selected from a group comprising a graphics processing unit (GPU), network cluster, supercomputer, and central processing unit (CPU);

exporting results of the plurality of operations; and utilizing exported results in at least one subsequent operation.

10. The method of claim 1 wherein:

estimating said noise level comprises at least one of: estimating a correlation, a standard deviation of error, and a spatial relationship;

receiving surface data comprises receiving at least one of: 3D spatial data, and reflectance data;

said receiving said reference data comprises receiving at least one of:

wavelet, sinusoid, reflectance data, shifted version of basis signal, 3D spatial data, and the parameter determined from the noise level; and said determining said parameter comprises determining at least one of:

curvature, 3D surface, slope, angle, position, delay, topology, geometry, noise, boundary, non-coplanar surface intersection, normal vector, tangent plane, gradient, simple shape, and contour line.

11. The method of claim 3, wherein determining non-connected surface boundaries comprises:

identifying non-connected objects;

parametrically defining adjacent non-connected objects; and processing parametrically defined adjacent non-connected objects.

12. The method of claim 11, wherein identifying non-connected objects comprises determining a threshold to distinguish connected objects from non-connected objects.

13. The method of claim 1, wherein determining a 3D surface further comprises utilizing reflective data associated with the object to enhance a 3D computer model by at least one of:

aligning reflective data to 3D spatial data;

creating geometric edges of polygons to correspond with edges of high deviation in reflective data;

generating a bump map;

generating a depth map; and mapping error information to 3D spatial data.

14. The method of claim 4 wherein said estimating said noise removal parameters comprises estimating at least one of: iso lines;

gradient vector; curvature; slope; and level of noise.

15. The method of claim 9 wherein utilizing said exported results comprises:

detecting redundant data among a plurality of segments; and eliminating redundant data.

16. A system operable to determine a parameter for a 3D computer model of a three-dimensional object, comprising:

a processing unit having a plurality of channels; and a program storage device carrying instructions that, when executed, cause the processing unit to:

receive surface data representing a contoured surface of a three dimensional object into memory of a computer having a processing unit, said surface data generated by a data acquisition device capable of generating the surface data;

receive a reference signal into the memory of the processing unit, the reference signal based on the surface property of the object related to the data generated by the data acquisition device;

estimate a noise level associated with the data with the processing unit;

identify a plurality of lines within the surface data with the processing unit, the plurality of lines each defining one of a breakline or a boundary of the contoured surface;

segment the surface data along the line data with the processing unit into a plurality of line data kernels representing the plurality of lines and a plurality of surface data kernels representing a plurality of non-coplanar surfaces separated by the plurality of lines;

compute a first set of parameters with the processing unit for a directional filter based on the estimated noise level;

compute a second set of parameters with the processing unit for a surface filter based on the estimated noise level;

apply the directional filter to each of the plurality of line data kernels in a direction of the line data for each of the line data kernels using a first channel of the processing unit operating in parallel to simultaneously remove noise from each the plurality of line data kernels;

apply the surface filter to each of the plurality of surface data kernels using a second channel of the processing unit operating in parallel to the channel of the processing unit to simultaneously remove noise from each of the plurality of surface data kernels; and generate refined surface data representing the contoured surface of the three dimensional object from the filtered line data kernels and the filtered surface data kernels by combining the separately filtered line data kernels and the separately filtered surface data kernels with the processing unit.

17. The system of claim 16 wherein said noise level comprises at least one of: a correlation, a standard deviation of error and a spatial relationship.

18. The system of claim 16 wherein the plurality of lines comprises at least one of:

non-coplanar surface intersections; and non-connected surface boundaries.

19. The system of claim 18 wherein estimating a noise level comprises:

estimating surface and line noise removal parameters with the processing unit;

verifying accuracy of noise removal from the plurality of surface data kernels and the plurality of line data kernels with the processing unit; and updating surface and line noise removal parameters with the processing unit based on the verified accuracy.

20. The system of claim 18, wherein defining non-connected surface boundaries comprises:

identifying non-connected surfaces from the surface data;

parametrically defining adjacent non-connected surfaces from the surface data; and processing parametrically defined adjacent non-connected surfaces with the processor.

21. The system of claim 20, wherein identifying non-connected surfaces comprises determining an appropriate threshold to distinguish connected surfaces from nonconnected surfaces with the processor.

22. The system of claim 18, further comprising utilizing reflective data associated with the object to enhance a 3D computer model with at least one of:

aligning the reflective data to 3D spatial data with the processor;

creating geometric edges of polygons to correspond with edges of high deviation in the reflective data with the processor;

generating a bump map with the processor;

generating a depth map with the processor; and mapping error information to 3D spatial data with the processor.

23. The system of claim 19, wherein updating said surface and line noise removal parameters comprises updating at least one of: iso lines;

gradient vector; curvature; slope; and level of noise.

24. The method of claim 16, further comprising:

performing in parallel a plurality of operations on the surface and line data using a plurality of channels of the processor selected from a group comprising a graphics processing unit (GPU), network cluster, supercomputer, and central processing unit (CPU);

exporting results of the plurality of operations; and utilizing exported results in at least one subsequent operation.

25. The system of claim 16 wherein:

estimating said noise level comprises at least one of: estimating a correlation, a standard deviation of error, and a spatial relationship;

receiving surface data comprises receiving at least one of: 3D spatial data, and reflectance data;

said receiving said reference data comprises receiving at least one of: wavelet, sinusoid, reflectance data, shifted version of basis signal, 3D spatial data, and the parameter determined from the noise level; and said determining said parameter comprises determining at least one of:

curvature, 3D surface, slope, angle, position, delay, topology, geometry, noise, boundary, non-coplanar surface intersection, normal vector, tangent plane, gradient, simple shape, and contour line.

26. The system of claim 18, wherein determining non-connected surface boundaries comprises:

identifying non-connected objects;

parametrically defining adjacent non-connected objects; and processing parametrically defined adjacent non-connected objects.

27. The system of claim 26, wherein identifying non-connected objects comprises determining a threshold to distinguish connected objects from non-connected objects.

28. The system of claim 16, wherein determining a 3D surface further comprises utilizing reflective data associated with the object to enhance a 3D computer model by at least one of:

aligning reflective data to 3D spatial data;

creating geometric edges of polygons to correspond with edges of high deviation in reflective data;

generating a bump map;

generating a depth map; and mapping error information to 3D spatial data.

29. The system of claim 25 wherein said estimating said noise removal parameters comprises estimating at least one of: iso lines; gradient vector; curvature; slope; and level of noise.

30. The system of claim 24 wherein utilizing said exported results comprises:

detecting redundant data among a plurality of segments; and eliminating redundant data.

31. The system of claim 16, wherein the processing unit comprises one: of a graphics processing unit (GPU); a network cluster; a supercomputer; and, a central processing unit (CPU).

* * * * *